United States Patent [19]

Nilsson

[11] Patent Number: 4,492,924

[45] Date of Patent: Jan. 8, 1985

[54] METHOD AND APPARATUS FOR ORE PROSPECTING UTILIZING AN AERIAL TRANSMITTER AND AERIAL RECEIVER

[75] Inventor: Bruno Y. Nilsson, Boliden, Sweden

[73] Assignee: Boliden Aktiebolag, Stockholm, Sweden

[21] Appl. No.: 285,077

[22] PCT Filed: Nov. 28, 1980

[86] PCT No.: PCT/SE80/00306
§ 371 Date: Jul. 8, 1981
§ 102(e) Date: Jul. 8, 1981

[87] PCT Pub. No.: WO81/01617
PCT Pub. Date: Jun. 11, 1981

[30] Foreign Application Priority Data

Nov. 29, 1979 [SE] Sweden ................. 7909875

[51] Int. Cl.³ .................. G01V 3/165; G01V 3/16
[52] U.S. Cl. .................. 324/330; 324/334
[58] Field of Search .................. 324/330, 334, 335

[56] References Cited

U.S. PATENT DOCUMENTS

| | | | |
|---|---|---|---|
| 2,931,973 | 4/1960 | Puranen | 324/330 X |
| 2,955,251 | 10/1960 | LaMotte Shaw et al. | 324/330 |
| 3,014,176 | 12/1961 | McLaughlin et al. | 324/330 |
| 3,548,299 | 12/1970 | Duroux et al. | 324/335 |
| 3,594,633 | 7/1971 | Barringer | |
| 3,763,419 | 10/1973 | Barringer | 324/334 |
| 3,936,728 | 2/1976 | Ghosh et al. | 324/335 |
| 4,047,098 | 9/1977 | Duroux | 324/335 |
| 4,198,596 | 4/1980 | Waeselynck et al. | 324/335 X |

FOREIGN PATENT DOCUMENTS

| | | | |
|---|---|---|---|
| 795919 | 10/1968 | Canada | 324/334 |
| 2390743 | 12/1978 | France . | |
| 353154 | 1/1973 | Sweden . | |
| 389202 | 10/1976 | Sweden . | |

Primary Examiner—Gerard R. Strecker
Attorney, Agent, or Firm—Stevens, Davis, Miller & Mosher

[57] ABSTRACT

The present invention relates to a method and apparatus for determining the electrical conductivity of the ground, particularly in connection with aerial prospecting, with the use of a transmitter unit (S) and a receiver unit (M) located at a distance from said transmitter unit and particularly carried by an aircraft (21). The transmitter is arranged to generate an electromagnetic field which induces an electric current in the ground, and the receiver is arranged to measure magnetic and electric fields induced by said current at the measuring site, said fields representing a measurement of said electrical conductivity and variations therein. The magnet field from the transmitter is transmitted horizontally as is directed transversally of an imaginary line that connects the transmitter (S) with the receiver (M). The electric field E from the transmitter is measured in the receiver in a radial direction to the transmitter. The magnetic field H is measured in a direction parallel with the magnetic transmitter-field. Of the measured magnitudes E and H the ratio E/H and/or the phase difference $\psi$ are formed, both of which are dependent on the electrical conductivity of the ground.

8 Claims, 3 Drawing Figures

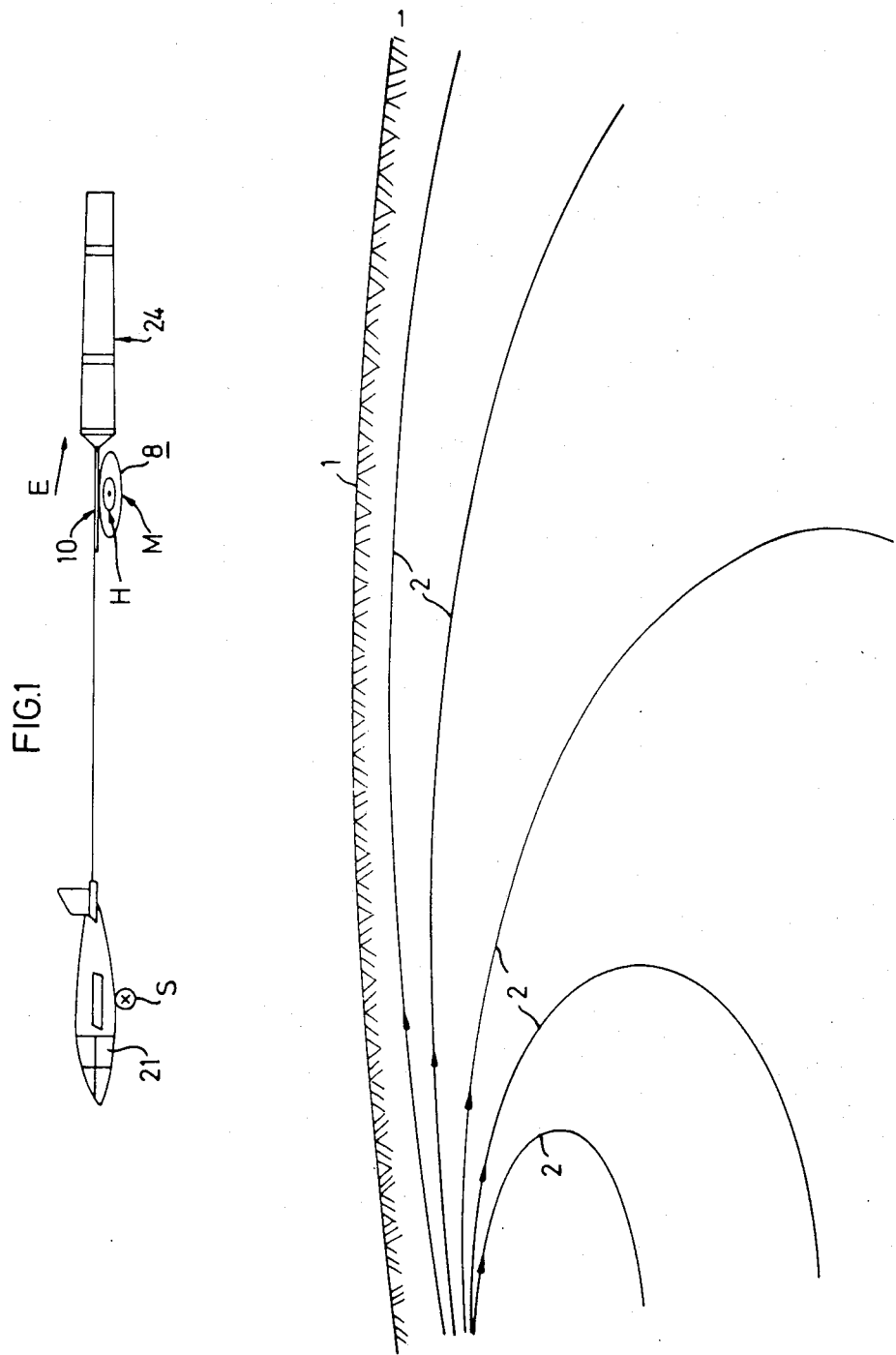

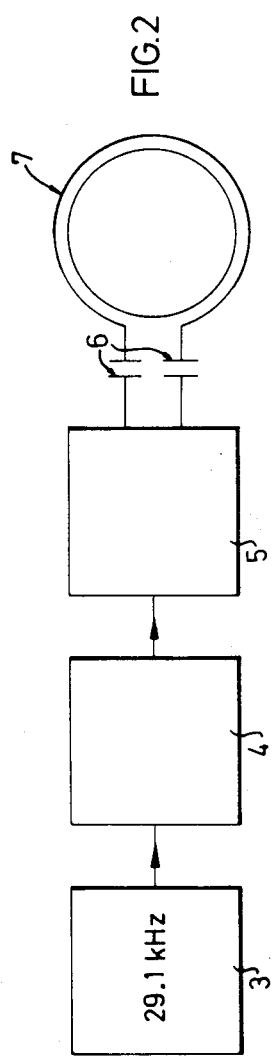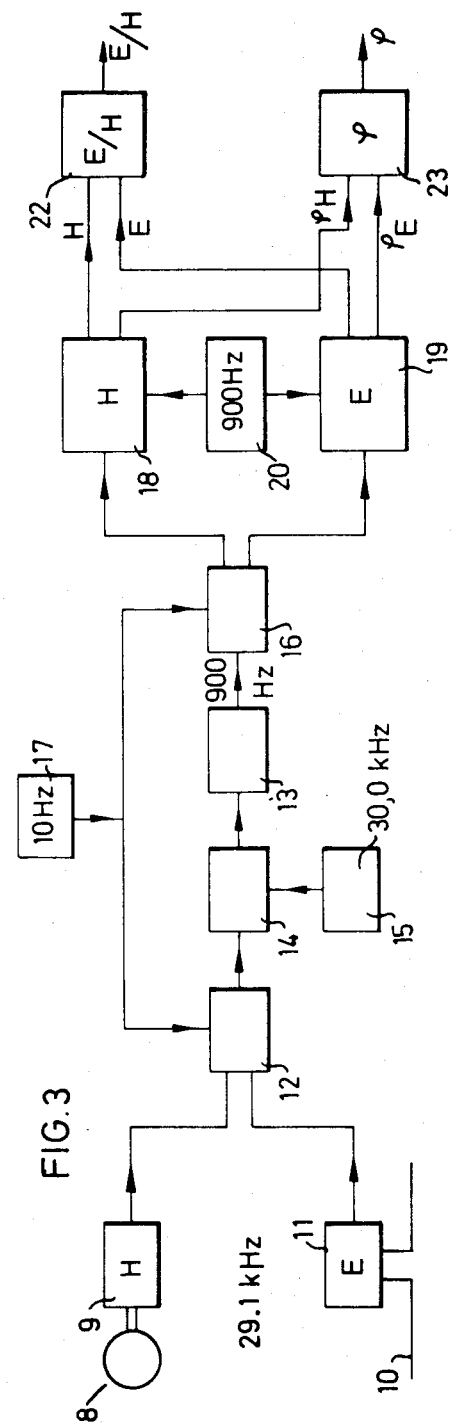

METHOD AND APPARATUS FOR ORE PROSPECTING UTILIZING AN AERIAL TRANSMITTER AND AERIAL RECEIVER

The present invention relates to a method and apparatus for determining the electrical conductivity of the ground, particularly in connection with aerial prospecting, with the use of a transmitter unit and a receiver unit located at a distance from said transmitter unit and carried by an aircraft, whereat the transmitter is arranged to generate an electromagnetic field which induces an electric current in the ground, and the receiver is arranged to measure magnetic and electric fields induced by said current at the measuring site, said fields representing a measurement of said electrical conductivity and variations therein. To this end, the method according to the invention is mainly characterized in that the magnetic field from the transmitter is transmitted horizontally and is directed transversally of an imaginary line that connects the transmitter with the receiver; that the electrical field E from the transmitter is measured in the receiver in a radial direction to the transmitter; that the magnetic field H is measured in a direction parallel with the magnetic transmitter-field; and in that of the measured magnitudes the ratio E/H and/or the phase difference $\psi$ are formed, both of which are dependent on the electrical conductivity of the ground.

The characterizing features of the apparatus and other characterizing features of the invention are set forth in the depending claims.

Different methods using electromagnetic techniques for prospecting ore have been used since 1920. Well known examples include Turam, Slingram, Rotary-field and Input. A common feature of this class of methods is that the mutual magnetic coupling between two coils is measured in one way or another, and utilized as a measurement of the electrical conductivity of the ground.

By utilizing a spectrum of frequencies, or the frequency content of a pulse or a train of pulses, it is possible to expand the scope of measurement with regard to electrical conductivity. In accordance with the invention there has been developed an alternative electromagnetic method, where the mutual coupling between an electric and a magnetic dipole is utilized instead. The invention affords the advantages whereby the whole of the resistivity range of interest can be covered with only one measuring frequency, and that resistivity probes can be made in a simple fashion. The method according to the invention can be applied to particular advantage when measuring the electrical conductivity of the ground from an aircraft. This is mainly due to the absence of primary electrical fields, since the invention pertains to the use of a magnetically induced electromagnetic field for prospecting purposes.

Described in the U.S. Pat. No. 3,936,728 is a method and apparatus for assaying the distribution of the electrical conductivity in the ground. Information is obtained concerning the distribution of the electrical conductivity (resistivity) of the ground between two locations, by generating an electro-magnetic field whose frequency can be varied within a desired range at one location, and by detection and comparison at the other of said locations, at a plurality of transmitted frequencies, of components of the magnetic and/or electric field that are in phase or out of phase with a reference signal generated electromagnetically at the said other location from the transmitted field, whereat no cable or other physical connection between the two locations is required. There is also described in detail the apparatus by which the electric field is produced, the reference signal generated, and the in phase and out of phase components of the magnetic and/or electrical field detected. Among the fields of application, it is mentioned that horizontal or other discontinuities in the distribution of the electrical conductivity are detected, for mapping geothermic and permafrost zones, or for discovering subterranean water fields or anomalous zones formed by bodies of ore.

Described in the U.S. Pat. No. 4,047,098 is a method and apparatus for sea-prospecting, in which an electromagnetic field is measured. A coil or loop, which transmits a magnetic field, is towed by means of its electric supply cables. The cables are plaited or twisted and have a cross-sectional area sufficient to maintain their electrical-resistance low. The loop itself has but a small reactance, because of the low frequency used. The detectors for sensing the components of the magnetic or electric field, which make it possible to detect variations in the resistance of the ground, are located, together with the loop-supply generator, on board the towing vessel. This method and apparatus are employed when prospecting for mineral deposits beneath the surface of the water, and generally for all geological survey work carried out on ground which is covered with water.

In Swedish Published Specification No. 353,154 (J. Duroux et al, convention priority date, inter alia, June 6, 1967, France) there is described a method of determining the resistivity within deep lying ground layers, by means of electromagnetic fields, which are generated by a transmitter with regulatable frequency. The transmitter comprises a magnetic dipole which is located at a distance from the measuring site, and which has a vertical axis. The transmitted field gives rise to an electromagnetic field at the location where the resistivity of the area is to be measured. This field is received by a receiver having a magnetic capturing device, which measures the radial component of the magnetic field, and an electric capturing device which measures the quadrature-axis component of the electric field, whereat the resistivity is proportional to the square of the ratio between said electric and magnetic components and inversely proportional to the frequency of the field.

In a metering array according to the invention, the expressions for the field strengths are very simple, if the transmitter and the receiver lie directly on homogenous ground and if the displacement current is ignored.

The radial electrical field strength can be expressed as $$|E| = \left| \frac{\mu_o \omega m}{4} \cdot \frac{1}{y^2} \cdot J_1(\sqrt{i} \cdot A) \cdot H_1^{(1)}(\sqrt{i} A) \right|$$

where
  $\mu_o$ is the magnetic premeability in vacuum
  $\omega$ is the angular frequency
  m is the dipole moment of the transmitter
  y is the distance between the transmitter and the receiver
  $J_1$ is the Bessel function of the first kind of order
  $H_1^{(1)}$ is the Bessel function of the third kind of order (the Hankel function).

Both of these complexes have here the complex argument ($\sqrt{1 \cdot A}$).

And where $$A = \frac{y}{2} \sqrt{\mu \omega \sigma}$$

in which $\sigma$ is the conductivity of the ground, and $\mu$ is the magnetic permeability of the ground.

The component of the magnetic field strength parallel to the transmitter axis can be expressed as $$|H| = \left| \frac{m}{2\pi y^3} \left[ \frac{e^{-\gamma y}}{y^2 \gamma^2} (3 + 3\gamma y + \gamma^2 y^2) + 1 - \frac{3}{y^2 \gamma^2} \right] \right|$$

where $$\gamma = \sqrt{i \sigma \mu_o \omega}$$

When y is large, the expression can be further simplified to $$|E| = \left| \frac{\sqrt{\mu_o \omega} \cdot m}{2\pi} \cdot \frac{1}{y^3} \cdot \sqrt{\rho} \right| \text{ and}$$

$$|H| = \left| \frac{m}{2\pi} \cdot \frac{1}{y^3} \right|$$

The value of the resistivity $\rho$ then becomes proportional to the quotient ($|E|/|H|$) squared, i.e.

$$\rho = \frac{1}{\sqrt{\mu_o \omega}} \cdot \left( \frac{|E|}{|H|} \right)^2$$

Under the above conditions, the phase angle between E and H is $$\psi = 45°$$

i.e. $\psi$ is constant when measuring the electrical conductivity of homogenous ground. The same applies to an airborne system, when the distance between transmitter and receiver is great in relation to the flying altitude.

The invention is not restricted to this particular case. For example, in the case of higher altitudes, evalution becomes more difficult, because attention must be paid to variations in altitude and to variations in the distance between transmitter and receiver.

FIG. 1 is an aerial arrangement of a transmitter and receiver.

FIG. 2 is a block schematic of the transmitter.

FIG. 3 is a block schematic of the receiver.

FIG. 1 illustrates in principle an arrangement in accordance with the invention between a transmitter S and a receiver M. The surface of the ground is referenced 1 and the field lines in the ground are shown by arrowed lines 2. The magnetic field transmitted by the transmitter dipole is drawn in the plane of the paper (a circle with a cross). By induction there is generated in the ground a current field, which in turn gives rise to a corresponding current field according to said lines. The induced field is directed to the right in the Figure at M.

At the same point there is a magnetic field H extending outwardly from the plane of the paper, i.e. at right angles to E. This field comprises the primary field from the transmitter dipole, and a secondary field generated by the current field induced in the ground. The orientation illustrated in FIG. 1 is advantageous in practice, since the electrical receiver antenna can then be oriented along the direction of movement of a movable measuring device, e.g. an airborne measuring device. In FIG. 1, the transmitter S is carried by an aircraft 21. The aircraft is arranged to tow a sleeve 24, which carries a dipole antenna 10 for E, and a dipole antenna 8 for H, and the general receiver equipment M.

FIG. 2 is a block schematic of the transmitter unit S. The transmitter includes a magnetic dipole 7 having a horizontal axis, which is directed transversally of an imaginary line connecting the transmitter with the receiver. The transmitter coil 7 with horizontal axis may have a radius of 0.3 m and may be wound with 100 turns of copper wire having a diameter of 2 mm. It is supplied with an alternating current of about 5 A at a frequency of about 30 kHz (in this case 29.1 kHz). A stable oscillator 3 supplies a signal at a frequency of 29.1 kHz to a drive stage 4, which in turn supplies a power amplifier 5 of about 100 W. The oscillator 3 must be extremely stable, since the measured signals will be very small and are measured over a very narrow band width in the receiver, which requires a corresponding frequency stability. The transmitter coil 7 forms together with two tuning capacitors 6 a series resonance circuit. The adaptation to the amplifier 5 must be very good, so as to obtain the highest possible efficiency. The magnetic dipole field induces an electromagnetic field in the ground, as illustrated in FIG. 1.

The receiver M, which is shown in block schematic form in FIG. 3, measures the electric and magnetic field strengths E and H respectively. The magnetic field is measured in a direction parallel with the transmitter dipole, while the electric field is measured in the radial direction of the transmitter. The receiver is located at a distance of about 100-400 meters from the transmitter, depending on how large a volume the measuring result shall represent. The receiver, which has two channels, is coupled to each of a magnetic and an electric dipole antenna 8 and 10 respectively, with the above described orientation. The magnetic antenna 8 is suitably a ferrite rod with a coil wound thereon, while the electric antenna 10 may comprise two horizontal conductors, each having a length of about 10-20 meters. The receiver is constructed so as to obtain a very high input impedance for the two channels, so that the antennae are not unduly loaded. The two channels are amplified in the order of one million times, so as to provide detectable measurement-signal levels. The band width is about 1 Hz, so as to suppress disturbances and noise to the greatest possible extent. A detector 18 and a detector 19 are arranged to detect output signals from respective channels and to store the amplitude and phase of said signals. By establishing the ratio between these signals, the influence of variations in the distance between the transmitter and the receiver can be effectively suppressed, which is essential, particularly when the measuring apparatus is airborne. More specifically, as illustrated in FIG. 3, the antenna 8 applies the signals having a frequency of 29.1 kHz to an input stage 9, which considerably amplifies the received signals. The antenna 10 supplies a corresponding input stage 11. That part of the receiver M common to both the H-channel and the E-channel includes a multiplex switch on both the input 12 and the output 16, controlled by an oscillator 17 having a frequency of about 10 Hz; and a mixer 14, a 30.0 kHz oscillator 15, and an intermediate frequency stage 13, whereat the intermediate frequency is 30.0–29.1, i.e. 900 Hz. The electronic switches 12 and 16 alternately couple in the input stages and detectors of respective channels, so that when the H-input stage 9 is activated, the H-detector 18 is also activated, the same also applying to the E-input stage 11 and the E-detector 19.

The detectors 18 and 19 are supplied with a reference frequency of 900 Hz, from a common oscillator 20. The detectors are of the commutating filter type.

Thus, a representation of the H-input signal and the E-input signal is constantly stored in respective detectors 18 and 19, in both phase and amplitude, despite the fact that only one of the detectors is coupled to its respective channel via the switch 16 at any one moment of time. A rectified /H/-signal and a rectified /E/-signal is taken from respective outputs of the detectors, and applied to a ratio former 22. There is also taken a phase signal $\psi_H$ and $\psi_E$ respectively, which are supplied to a phase detector 23, for determining the time differences between the H and E signals. There is then obtained from the measuring arrangement firstly the ratio E/H and secondly the phase difference $\psi$, both of which are dependent on the electrical conductivity of the ground. The phase difference gives, primarily, an indication of changes in electrical conductivity, while $/E/H/^2$, on the other hand, primarily represents the absolute magnitude of said conductivity.

The described apparatus or arrangement affords a number of important advantages over those apparatus and systems described in the U.S. patent specification and the Swedish Published Specification discussed in the introduction. Thus, the method according to the invention can be applied, inter alia, for determining the electrical conductivity of the ground with the aid of measurements taken with airborne apparatus, which cannot be achieved with the known apparatus and systems. In the arrangements according to claim 4 of the U.S. Pat. No. 3,936,728 and in claim 1 of the U.S. Pat. No. 4,047,098, and in claim 1 of the Swedish Published Specification, measurement of the electric field is assumed to be effected at right angles to an imaginary line through the transmitter and receiver. This renders it difficult in practice to produce an airbourne system, owing to the length of the electric dipole antenna. In the method of the present invention, the electric field is measured in the radial direction, which means that the antenna can be towed in its axial direction.

According to the known technique, the electric field is measured as the potential difference between two earthed electrodes. In the method of the present invention, the electric field is measured with the aid of a capacitive electric dipole, i.e. the antenna requires no direct contact with the ground and can thus be used in an airborne system; it can also be used to measure frozen or snowcovered ground, as opposed to what can be achieved by the known apparatus or systems.

In the method according to the U.S. Pat. No. 3,936,728, measurement of the different field components is effected relative to a reference signal which is captured electromechanically at the receiver. The arrangement according to the invention is based on the direct measurement of two field components, i.e. a reference signal is not required.

The U.S. Pat. No. 4,047,098 and the Swedish Published Specification relate exclusively to vertical transmitter dipoles, which differ completely to the horizontal dipoles employed in the method of the present invention. In itself the horizontal dipole affords the advantage that the field generated decreases with the cube of the distance between transmitter and receiver, as opposed to the vertical dipole, where the decrease takes place with the distance raised to the power of four. This is important in a practical system, in which it is desired to limit the energy requirements, so that the weight of the equipment can be kept as low as possible.

I claim:

1. A method for determining the electrical conductivity of the ground, particularly in connection with aerial prospecting, comprising generating an electromagnetic field which induces an electric current in the ground by means of an aerial transmitter unit, measuring the magnetic and electric fields induced by said current at the measuring site by means of an aerial receiver unit, said fields representing a measurement of said electrical conductivity and variations therein, said electromagnetic field from the transmitter being transmitted horizontally and directed transversally of an imaginary line that connects the transmitter with the receiver; a horizontal component of an electric field E being measured in the receiver in a radial direction to the transmitter; a magnetic field H being measured in a direction parallel with the magnetic field from the transmitter; and forming from the measured magnitudes the ratio E/H and/or the phase difference $\psi$, both of which are dependent on the electrical conductivity of the ground.

2. A method according to claim 1, including feeding the H-signal and the E-signal to a respective input stage and, via a first multiplex switch, to a common channel having a mixer and intermediate frequency stage, and from there to individual H and E output stages, via a second multiplex switch; storing the representations of the H and E input signals in said output stages, both with respect to amplitude and phase; and supplying a ratio former and/or a phase-difference former with these stages.

3. Apparatus for determining the electrical conductivity of the ground, particularly in connection with aerial prospecting, comprising a transmitter unit and a receiver unit located at a distance from the transmitter unit and particularly carried by an aircraft, whereat the transmitter unit is arranged to generate an electromagnetic field which induces a current in the ground, and the receiver is arranged to measure magnetic and electric fields induced at the measuring site by said current, said fields representing a measurement of said electrical conductivity and variations therein, said transmitter unit including a magnetic dipole antenna having a horizontal axis directed transversally of an imaginary line which connects the transmitter with the receiver; the receiver unit including an electric dipole antenna arranged to capture the horizontal electric field component of the electric field E in a radial direction to said transmitter, and a magnetic dipole antenna arranged to capture the magnetic field H in a direction parallel with the transmitter magnetic dipole; and means for forming the ratio E/H and/or the phase difference $\psi$ between E and H, said ratio and said phase difference both being dependent on the electrical conductivity of the ground.

4. Apparatus according to claim 3, including an aircraft for carrying said transmitter and its magnetic dipole antenna; and a device towed behind the aircraft for carrying said receiver and its electric and magnetic dipole antenna.

5. Apparatus according to claim 3, wherein the transmission frequency is of the order of 30 kHz, and is constant.

6. Apparatus according to any one of claims 3-5, wherein the receiver includes an H-channel and an E-channel coupled to respective dipole antennae, a mixer, an oscillator, and an intermediate frequency stage including a part which is common to said channels preceded by an input multiplex switch and followed by an output multiplex switch, said switches being operative to alternately connect, over said common part, the H-input to an H-detector and the E-input to an E-detector respectively, said detectors constantly having stored therein a relevant representation of the H and E input signals respectively, with respect to both amplitude and phase, and further includes a ratio former and squaring means arranged to be supplied with rectified H and E output signals from said detectors.

7. Apparatus according to claim 6, wherein the detectors are of the commutating filter kind.

8. Apparatus according to claim 6 including a phase-difference former arranged to be supplied with $\psi_H$- and $\psi_E$-phase output signals.

* * * * *